US008730879B2

(12) United States Patent
Seyedi-Esfahani et al.

(10) Patent No.: US 8,730,879 B2
(45) Date of Patent: May 20, 2014

(54) COMMUNICATION DEVICE AND METHOD OF COMMUNICATION THAT BONDS COMMUNICATION CHANNELS TOGETHER

(75) Inventors: Seyed-Alireza Seyedi-Esfahani, Fairport, NY (US); Chun-Ting Chou, Taipei (TW)

(73) Assignee: Koninklijke Philips N.V., Eindhoven (NL)

( * ) Notice: Subject to any disclaimer, the term of this patent is extended or adjusted under 35 U.S.C. 154(b) by 1314 days.

(21) Appl. No.: 12/522,935

(22) PCT Filed: Jan. 14, 2008

(86) PCT No.: PCT/IB2008/050117
§ 371 (c)(1),
(2), (4) Date: Jul. 13, 2009

(87) PCT Pub. No.: WO2008/087580
PCT Pub. Date: Jul. 24, 2008

(65) Prior Publication Data
US 2010/0046450 A1   Feb. 25, 2010

Related U.S. Application Data

(60) Provisional application No. 60/885,161, filed on Jan. 16, 2007.

(51) Int. Cl.
*H04W 4/00* (2009.01)
(52) U.S. Cl.
USPC .......................................... 370/329
(58) Field of Classification Search
USPC .......................................... 370/329
See application file for complete search history.

(56) References Cited

U.S. PATENT DOCUMENTS

| 5,592,470 | A  | * | 1/1997 | Rudrapatna et al. | 370/320 |
| 7,424,001 | B2 | * | 9/2008 | Kim et al. | 370/338 |
| 2005/0136933 | A1 | * | 6/2005 | Sandhu et al. | 455/450 |
| 2006/0182152 | A1 | * | 8/2006 | Bi et al. | 370/542 |
| 2007/0058655 | A1 | * | 3/2007 | Myers | 370/437 |

FOREIGN PATENT DOCUMENTS

| EP | 1693994 A1 | 8/2006 |
| WO | WO2005018180 A1 | 2/2005 |
| WO | WO2006132506 A1 | 12/2006 |

* cited by examiner

*Primary Examiner* — Shripal Khajuria
(74) *Attorney, Agent, or Firm* — Larry Liberchuk

(57) ABSTRACT

A wireless device (100) communicates in a wireless system by selecting a communication channel (202) for communication, identifying a control channel or control channels (204) designated for communication of control information for the selected communication channel, and listening for the control information (212) on the control channel to determine if the selected communication channel is bonded with any other communication channel. When control information is received via the control channel(s) indicating that the selected communication channel is bonded with at least one other communication channel, then the wireless device abstains from communication on the selected communication channel, or communicates in a narrowband mode. When control information is received via the control channel(s) indicating that the selected communication channel is not bonded with another communication channel, or when no control information is received via the control channel, then the wireless device communicates via the selected communication channel.

20 Claims, 4 Drawing Sheets

COMMUNICATION DEVICE AND METHOD OF COMMUNICATION THAT BONDS COMMUNICATION CHANNELS TOGETHER

CROSS-REFERENCES TO RELATED APPLICATIONS

This patent application claims the priority benefit of U.S. Provisional patent Application No. 60/885,161, filed on 16 Jan. 2007, the entirety of which is hereby incorporated by reference as if fully set forth herein.

TECHNICAL FIELD

This invention pertains to the field of wireless communications, and more particularly to a wireless communication device and method of wireless communication in a communication network that bonds communication channels together.

BACKGROUND AND SUMMARY

As the demand for new wireless communication services and systems continues to expand, appropriate unused frequency spectrum for these new wireless systems becomes more difficult to identify. Often the available spectrum is divided into different frequency bands for use by devices in a wireless system. In same cases, these frequency bands can be considered to define logical channels, i.e., at a given point in time and in a given geographical area, each frequency band is used by a group of wireless devices that communicate to each other.

Since the bandwidth efficiency of a communication system is limited by practical considerations, in some cases it may be desired to allow some of the wireless devices to use a wider bandwidth than originally allotted.

One technique that can be employed to enable wireless devices to use a wider bandwidth than is available in a predefined channel allocation is channel bonding. When channel bonding is used, two or more logical channels are linked together so that they may all be used together by one or more wireless devices to communicate data. These logical channels may or may not be adjacent in frequency and/or time. By bonding channels together, a greater total data throughput may be achieved than is possible with any one communication channel. Once a group of two or more communication channels have been bonded together, they may be treated by some layers of the communication protocol employed by a wireless device as if they constitute a single communication channel having a greater data capacity. Also, if one wireless device requires more bandwidth than a single communication channel provides, but does not need all of the bandwidth of the bonded channels, then the remaining unused capacity could be used by other wireless devices who are aware of the channel bonding and capable of operating with bonded channels themselves.

Some examples of when channel bonding may be used are: (1) where next generation wireless devices are being designed for an existing standard, and it is desired to guarantee coexistence, and/or interoperability with other, existing devices and services; (2) where two or more different types of wireless devices (e.g., narrowband and wideband) with different sets of capabilities and cost structures are envisioned to share spectral resources, and/or operate in the same system or network; and (3) where two or more different types of wireless devices (e.g., narrowband and wideband) are envisioned to be used in conformity with the same communication standard, due to different regulations in different regulatory domains.

However, when a system permits channel bonding, then certain problems may be presented, particularly for any reduced-capability devices that are not capable of such channel bonding. For example, in some wireless networks often a particular portion of the available communication resources (e.g., in time and/or in frequency) is allocated for transmission of control signals (e.g., beacons). These signals are used for coordination of communication resources (e.g., channels, bandwidth, time slots, etc.) among a group of devices that are sharing these resources. These signals are also used by "new" wireless devices to see if a channel is occupied or idle. Thus, when channel bonding is employed, it is essential that the control information is transmitted in a fashion that even the devices that are not capable of channel bonding are also able to receive this control information.

Accordingly, it would be desirable to provide a wireless communication device and method of wireless communication in a wireless communication system that support channel bonding and allow even those device that are not capable of channel bonding to share communication resources.

In one aspect of the invention, a method is provided for a wireless device to communicate in a wireless system. The method comprises: selecting a communication channel for communication; identifying a control channel that has been designated for communication of control information pertaining to the selected communication channel; listening for control information on the control channel to determine whether the selected communication channel is bonded with at least one other communication channel.

In another aspect of the invention, a wireless device is adapted to communicate in a communication system. The wireless device comprises: a receiver; a transmitter; and at least one antenna operatively connected to the receiver and transmitter. The wireless device: selects a communication channel for communication; identifies a control channel that has been designated for communication of control information pertaining to the selected communication channel; and listens for control information on the control channel to determine whether the selected communication channel is bonded with at least one other communication channel.

In yet another aspect of the invention, a method is provided for a wireless device to communicate in a wireless system. The method comprises: selecting a channel group for communication; identifying a control channel designated for communication of control information pertaining to the selected channel group; listening for control information on the control channel; and when no control information is received via the control channel, then transmitting control information via the control channel, the control information indicating that the control channel is bonded to at least one other communication channel.

DETAILED DESCRIPTION

Figure 1:
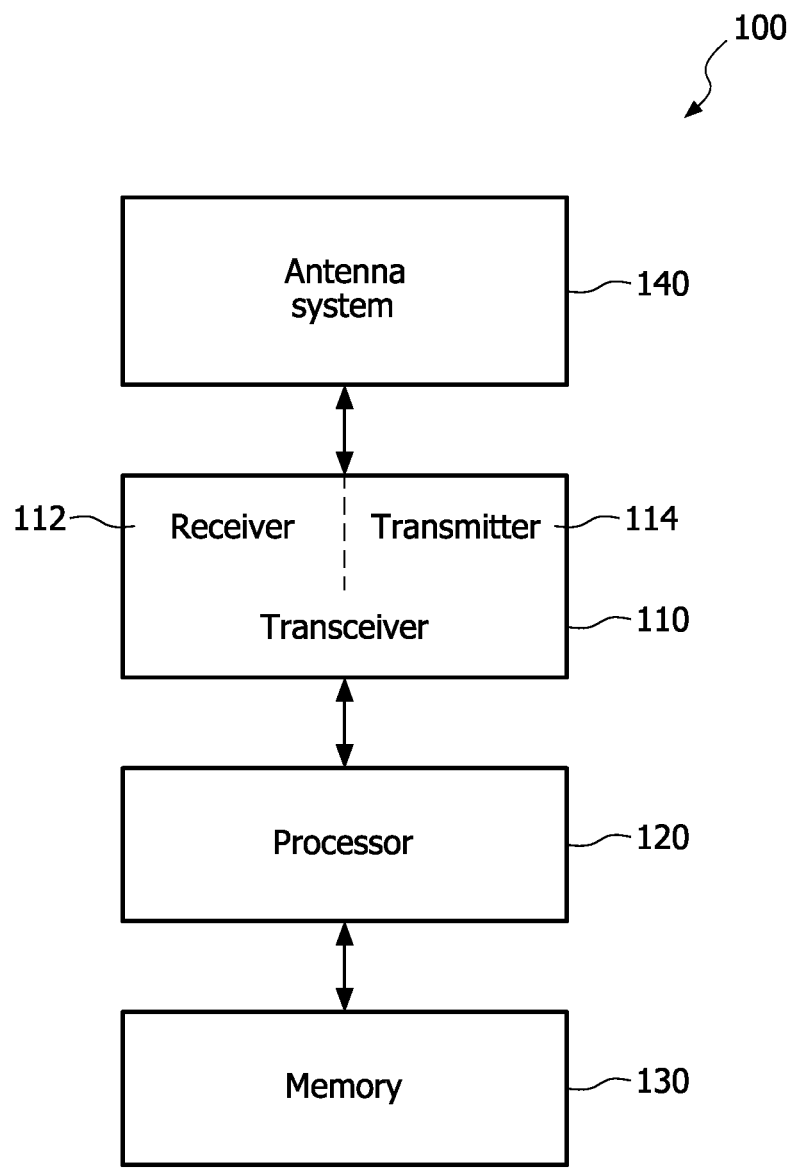
FIG. 1 is a functional block diagram of one embodiment of a wireless device.

FIG. 1 is a functional block diagram of a wireless device 100. As will be appreciated by those skilled in the art, one or more of the various "parts" shown in FIG. 1 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 100 includes a transceiver 110, processor 120, memory 130, and an antenna system 140.

Transceiver 110 includes a receiver 112 and a transmitter 114 and provides functionality for wireless device 100 to communicate with other wireless devices in a wireless communication network according to the standard protocols of the wireless communication network. For example, in one embodiment wireless device 100 is a 60 GHz wireless device.

Processor 120 is configured to execute one or more software algorithms in conjunction with memory 130 to provide the functionality of wireless device 100. Beneficially, processor 120 includes its own memory (e.g., nonvolatile memory) for storing executable software code that allows it to perform the various functions of wireless device 100. Alternatively, the executable code may be stored in designated memory locations within memory 130.

In FIG. 1, in one embodiment antenna system 140 may be a directional antenna system provides a capability for wireless device 100 to select from a plurality of antenna beams for communicating with other wireless devices in a plurality of directions. In one embodiment, directional antenna system 140 comprises a plurality of antennas each corresponding to one antenna beam. In another embodiment, directional antenna system 249 comprises a steerable antenna that can combine a plurality of different antenna elements to form a beam in a plurality of different directions.

In the discussion to follow, an exemplary embodiment is described for a wireless system that operates using superframes including beacon periods wherein wireless devices may transmit beacons that include control information regarding the use of communication resources (e.g., communication channels) by the wireless devices. This concrete example is provided for illustration purposes and is not to be construed as limiting the scope of the teachings of this specification, or the claims to follow.

Beneficially, all groups of channels that may be potentially bonded together are predefined in advance, and the predefined information is made available to all wireless devices, whether they are capable of bonding channels themselves, or not. For each predefined group of channels that may be bonded together, a reference control channel is defined. Also, a reference channel is defined for each communication channel that operates in an unbonded mode. These reference control channels may or may not be data communication channels. All of the control data which indicates which, if any, channels are bonded together will only be transmitted in the reference control channel, whether bonding is used or not. When a group of channels is bonded together, data packets may be transmitted using all of the bonded group of channels ("wideband mode"), or using only a subset—or even just one—of the bonded channels ("narrowband mode").

In one exemplary embodiment, a system may include three communication channels: 1, 2, and 3. In this example, the possible sets of channels used for bonding are (1,2), (2,3) and (1,2,3). Furthermore, in this example channel 2 is designated as the reference control channel for all the bonding modes. Hence, the possibilities are as shown in Table 1 below.

TABLE 1

| Mode | Channels used | Reference Control Channel |
|---|---|---|
| No channel bonding | 1 | 1 |
| No channel bonding | 2 | 2 |
| No channel bonding | 3 | 3 |
| Channel bonding | 1, 2 | 2 |
| Channel bonding | 2, 3 | 2 |
| Channel bonding | 1, 2, 3 | 2 |

Also, in this exemplary embodiment, control information (including information regarding whether a channel is bonded or not) is transmitted via one or more beacons transmitted during a beacon period of a superframe structure employed by the communication channels. In the case of Table 1, the beacon(s) including the control information indicating the channel bonding modes are transmitted only on channel 2 (i.e., in a "narrowband mode").

Although Table 1 indicates an example where there are three communication channels, in general many more communication channels may be employed, and communication channel groups having various combination of two, three, four or more communication channels may be predefined. Also, although in the example of Table 1 communication channel 2 serves as the control channel for all of the predefined channel groups, in general a plurality of predefined channel groups may have a plurality of different control channels.

Figure 2:
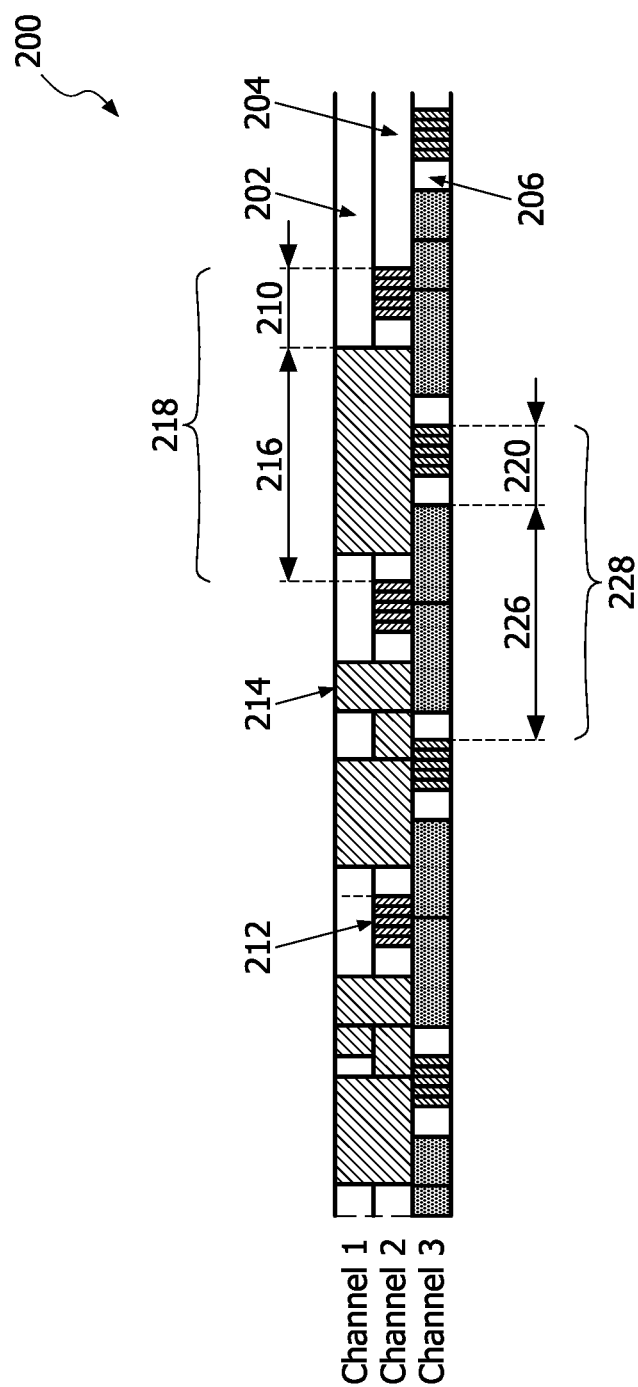
FIG. 2 illustrates communication channels that may be employed by wireless devices according to one embodiment.

FIG. 2 illustrates set 200 of communication channels 202 ("channel 1"), 204 ("channel 2"), and 206 ("channel 3") which operate according to the predefined channel groupings of Table 1. FIG. 2 illustrates a case where communication channels 202 and 204 are bonded together, and where communication channel 206 is not bonded. FIG. 2 illustrates a beacon period 210 in control channel 204 (channel 2) wherein beacon transmissions 212 are transmitted. FIG. 2 also illustrates data packets 214 being transmitted during a data transmission period 216 of the bonded communication channels 202 and 204. Together, beacon period 210 and data transmission period 216 define a superframe 218 of communication channel 204. FIG. 2 further illustrates a beacon period 220 and a data transmission period 226 of unbonded communication channel 206. Together, beacon period 220 and data transmission period 226 define a superframe 228 of control channel 204.

It can be seen from FIG. 2 that the beacon transmissions 212 for communication channels 202 and 204 only appear on the control channel, which is communication channel 204 (channel 2).

In general, if a new wireless device that is not capable of operating with bonded communication channels powers-up and would like to use one or more of the communication channels 202/204/206 (e.g. a selected communication channel 202) that belong to any of the predefined bonding groups of Table 1, then the new wireless device must first go to the designated control channel for that group (e.g. 204) and listen for beacons 212 for a duration of time (e.g., at least one superframe period). If no beacons are received on any control channel (e.g. 204) that is designated for any group that includes the data channel (e.g. 202), or if the received beacons indicate that the selected communication channel 202 is not bonded, then the newly powered up wireless device concludes that the data channel is not bonded. In that case, the wireless device switches to the selected communication channel 202, listens for any beacons transmitted on channel 202. If the device finds beacons, it can join the beacon group, otherwise it transmits its own beacons to establish a new beacon group. Beneficially, the wireless device transmits a beacon in the beacon period of the selected communication channel 202 which includes control information, including data indicating that the selected communication channel 202 is not bonded. This can prevent another wireless device from attempting to bond communication channel 202 with some other communication channel while communication channel 202 is being used by the first wireless device.

If the beacons received on a designated control channel indicate that the data channel is bonded, the new device can join that beacon group, but only transmit in the narrow band mode (i.e., only using one of the bonded channels).

Figure 3:
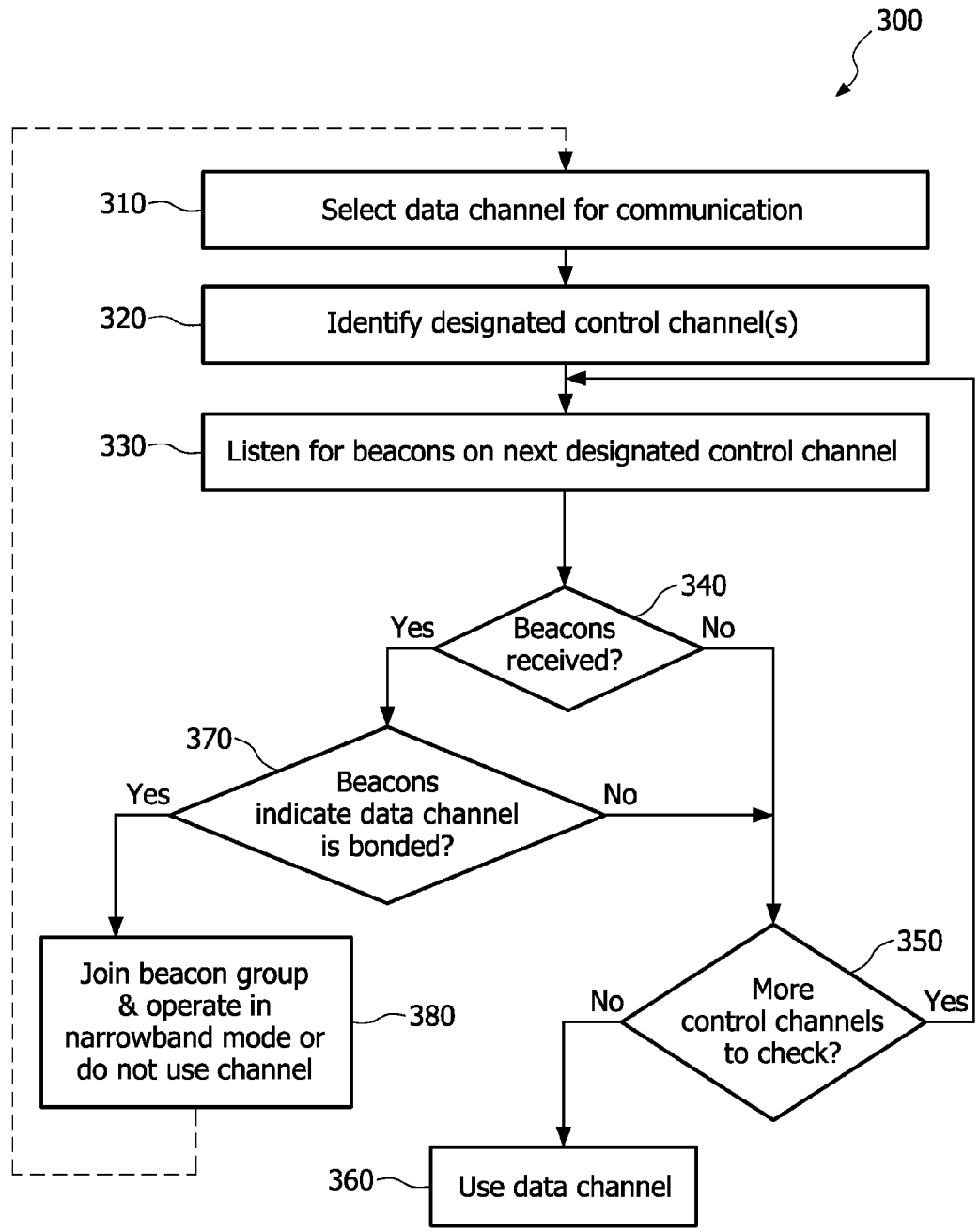
FIG. 3 is a flowchart illustrating a method of communication according to a first embodiment.

FIG. 3 is a flowchart illustrating a method 300 of communication according to a first embodiment. In particular, method 300 is one embodiment of a method for a new wireless device—that is not capable of operating with bonded communication channels—to identify a communication channel for communicating data.

In a first step 310, the wireless device selects a communication channel on which it wants to communicate data.

In a next step 320, the wireless device identifies all designated control channels for all channel groups to which the selected communication channel belongs. Beneficially, the possible channel groups and their corresponding designated control channels are all predefined. In that case, they may be stored in memory in the wireless device.

In a step 330, the wireless device listens for a period of time (e.g., at least one superframe period) on one of the designated control channels for any beacons that may be received. Any such beacons may include control information that indicates whether the selected communication channel is bonded into the predefined channel group.

In a step 340 the wireless device determines whether it received any beacons on the control channel.

If no beacons are received on the control channel, then it is apparent that the selected communication channel is not bonded into the corresponding predefined channel group. In that case in a step 350 the wireless device determines whether there are any other control channels for other possible channel groups that include the selected communication channel that remain to be checked.

If further control channels remain to be checked, then the process returns to step 330 and the wireless device listens on the next designated control channel for any beacons that may be received.

On the other hand, if all designated control channels identified in step 320 have been checked, then in a step 350 the wireless device determines that it may use the selected communication channel either by joining an existing beacon group in the data channel or by starting its own beacon group. Beneficially, the wireless device transmits a beacon in the beacon period of the selected communication channel which includes control information, including data indicating that the selected communication channel is not bonded. This can prevent another wireless device from attempting to bond the selected communication channel with some other communication channel while it is being used by the first wireless device.

Meanwhile, if in step 340 it is determined that any beacons are received on the control channel, then in a step 370, the wireless device determines whether the beacon(s) indicate that the selected communication channel is bonded into the predefined channel group.

If the received beacon(s) indicate that that the selected communication channel is not bonded into the predefined channel group, then the process proceeds to step 350 as described above.

On the other hand, if the received beacon(s) indicate that the selected communication channel is bonded into the predefined channel group, then in a step 380 the new wireless device can join that beacon group, but only transmit in the narrow band mode, or it can refrain from using the selected communication channel. In case the wireless device determines to refrain from using the communication channel, then the process may return to step 310 wherein the wireless device selects a new communication channel.

It should be noted that only when all predefined channel groups to which the selected communication channel may belong have been successfully checked for bonding can the process proceed to step 360. Otherwise, if the selected communication channel is bonded in any of the predefined channel groups, then the process results in step 380.

Figure 4:
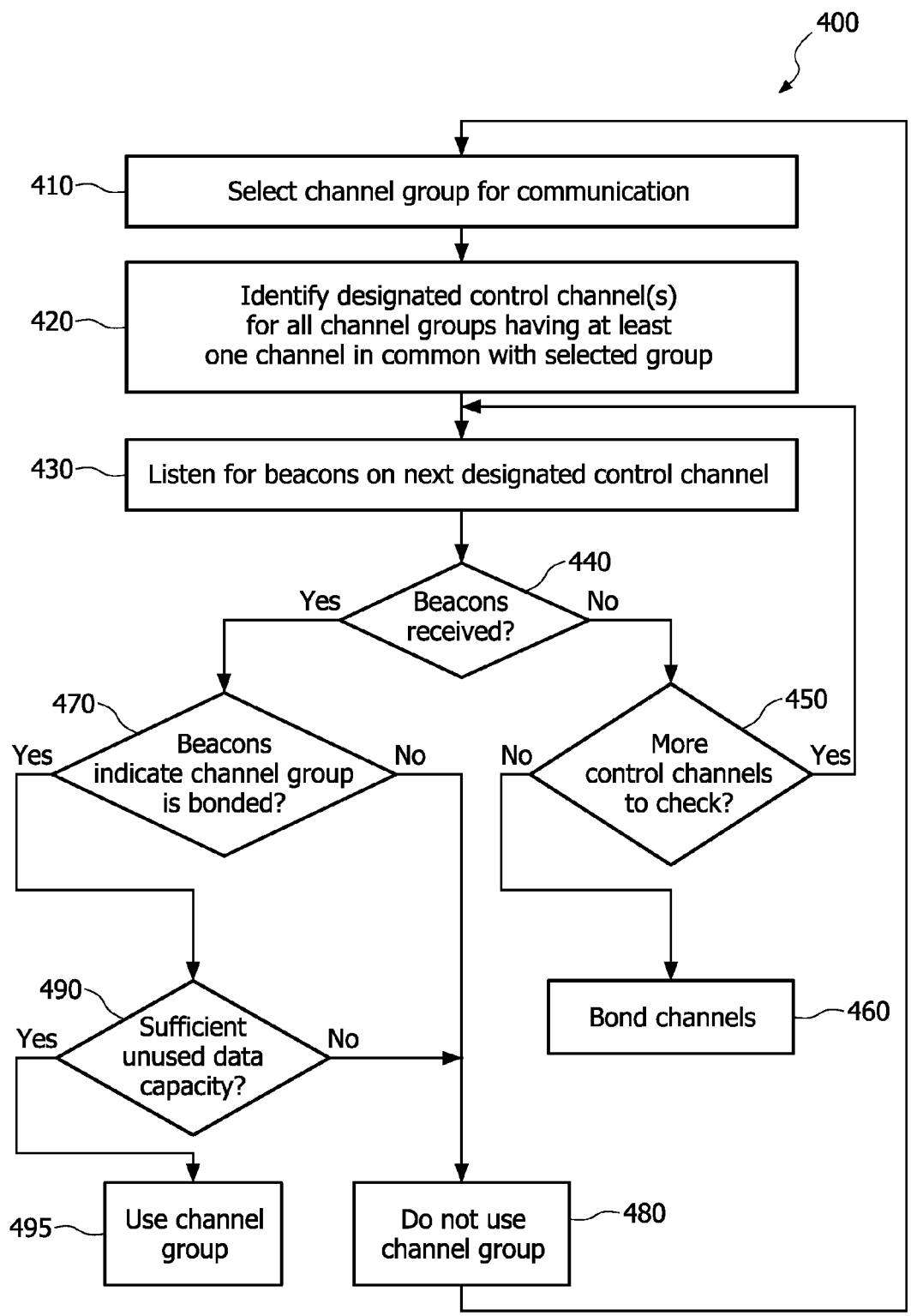
FIG. 4 is a flowchart illustrating a method of communication according to a second embodiment.

FIG. 4 is a flowchart illustrating a method of communication according to a second embodiment. In particular, method 400 is one embodiment of a method for a wireless device to communicate data using bonded communication channels.

In a first step 410, the wireless device selects a communication channel group which it wants to employ for communicating data. Typically, the wireless device will select a communication channel group for communication when it wants to communicate data at a greater throughput rate than is possible using a single communication channel. Beneficially, the wireless device may select a communication channel group whose data capacity matches the data throughput needed by the wireless device.

In a next step 420, the wireless device identifies all designated control channels for all channel groups that have one or more channels in common with the channel group which it wants to employ to communicate. Beneficially, the possible wireless groups and their corresponding designated control channels are all predefined. In that case, they may be stored in memory in the wireless device.

In a step 430, the wireless device listens for a period of time (e.g., at least one superframe period) on one of the control channels for any beacons that may be received. Any such beacons may include control information that indicates whether the selected communication channel is bonded into a predefined channel group.

In a step 440 the wireless device determines whether it received any beacons on the control channel.

If no beacons are received on any of the identified control channels, then in a step 450 the wireless device determines whether there are any other control channels that were identified in step 420 that remain to be checked.

If further control channels remain to be checked, then the process returns to step 430 and the wireless device listens on the next designated control channel for any beacons that may be received.

On the other hand, if all designated control channels identified in step 420 have been checked, then it is determined that the selected communication channel group is available to be bonded. In that case, in a step 460 the wireless device may use the selected communication channel group. Beneficially, the wireless device transmits a beacon in the beacon period of the control channel for the selected communication channel group which includes control information, including data indicating that the selected communication channel is bonded into the selected communication channel group.

If any beacons are received on the control channel, then it is apparent that the control channel is in use. In that case, in a step 470, the wireless device determines whether the beacon(s) indicate that the selected communication channel group is bonded or unbonded.

If the received beacon(s) indicate that that one of the channels within the selected communication channel group are in use (bonded or not bonded), then in a step 480 the wireless device abstains from using the selected communication channel group. In that case, the process may return to step 410 wherein the wireless device selects a new communication channel group.

On the other hand, if the received beacon(s) indicate that the selected communication channel is bonded into the predefined channel group, then in a step 490 the wireless device determines whether sufficient data capacity exists in the bonded communication channel group to support the data throughput needed by the wireless device. If so, then in a step 495, the wireless device communicates using the available capacity in the bonded communication channel group. If not, then the wireless device abstains from using the selected communication channel group in step 470.

Furthermore, if the received beacons indicate that all of the channels within the selected channel group are available, the device can bond them together. Beneficially, the device then transmits beacons in the designated control channel to identify the channel group as bonded.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of communication by a wireless device in a wireless system, comprising:
   selecting a wireless communication channel for communication;
   identifying a control channel that has been designated for communication of control information pertaining to the selected wireless communication channel;
   listening for control information on the control channel to determine whether the selected wireless communication channel is bonded with at least one other wireless communication channel.

2. The method of claim 1, wherein the control channel is on a different frequency band than the selected wireless communication channel.

3. The method of claim 1, further comprising:
   when the control information is received via the control channel and the control information indicates that the selected wireless communication channel is bonded with at least one other wireless communication channel, then abstaining from communication on the selected wireless communication channel or communicating on the selected wireless communication channel in a narrowband mode; and
   when the control information is received via the control channel and the control information indicates that the selected wireless communication channel is not bonded with at least one other wireless communication channel, or when no control information is received via the control channel, then communicating via the selected wireless communication channel.

4. The method of claim 3, wherein communicating via the selected wireless communication channel includes transmitting control information for the selected wireless communication channel via the control channel, the control information indicating that the selected wireless communication channel is not bonded to at least one other wireless communication channel.

5. The method of claim 3, further comprising when the control information is received via the control channel indicating that the selected wireless communication channel is bonded with at least one other wireless communication channel, then:
   selecting a second wireless communication channel for communication;
   identifying a second control channel that has been designated for communication of control information pertaining to the second wireless communication channel;
   listening for control information on the second control channel.

6. The method of claim 5, wherein the control channel is also the second control channel.

7. The method of claim 1, wherein identifying a control channel that has been designated for communication of control information pertaining to the selected wireless communication channel comprises accessing data stored in memory of the wireless device which identifies a control channel for each wireless communication channel that can be bonded to any other wireless communication channel of the wireless system.

8. The method of claim 1, wherein listening for control information on the control channel comprises listening for beacons transmitted during a beacon period in a superframe of the control channel.

9. A wireless device adapted to communicate in a communication system, the wireless device comprising:
   a receiver;
   a transmitter; and
   at least one antenna operatively connected to the receiver and transmitter,
   wherein the wireless device:
      selects a wireless communication channel for communication;
      identifies a control channel that has been designated for communication of control information pertaining to the selected wireless communication channel; and
      listens for control information on the control channel to determine whether the selected wireless communication channel is bonded with at least one other wireless communication channel.

10. The wireless device of claim 9, wherein the wireless device abstains from communication on the selected wireless communication channel, or communicates on the selected wireless communication channel in a narrowband mode, when the control information is received via the control channel and the control information indicates that the selected wireless communication channel is bonded with at least one other wireless communication channel, and wherein the wireless device communicates via the selected wireless communication channel when the control information is received via the control channel and the control information indicates that the selected communication channel is not bonded with at least one other wireless communication channel, or when no control information is received via the control channel.

11. The wireless device of claim 10, further comprising when the control information is received via the control channel indicating that the selected wireless communication channel is bonded with at least one other wireless communication channel, then:
   selecting a second wireless communication channel for communication;

identifying a second control channel that has been designated for communication of control information pertaining to the second wireless communication channel; and listening for control information on the second control channel to determine whether the second wireless communication channel is bonded with at least one other wireless communication channel.

12. The wireless device of claim 11, wherein the control channel is also the second control channel.

13. The wireless device of claim 10, wherein communicating via the selected wireless communication channel includes transmitting control information for the selected wireless communication channel via the control channel for the selected wireless communication channel, the control information indicating that the selected wireless communication channel is not bonded to at least one other wireless communication channel.

14. The wireless device of claim 9, wherein identifying a control channel designated for communication of control information pertaining to the selected wireless communication channel comprises accessing data stored in memory of the wireless device which identifies a control channel that can be bonded to any other wireless communication channel for each wireless communication channel of the communication system.

15. The wireless device of claim 9, wherein listening for control information on the control channel comprises listening for beacons transmitted during a beacon period in a superframe of the control channel.

16. A method of communication by a wireless device in a wireless system, comprising:

selecting a wireless channel group for communication;

identifying a control channel that has been designated for communication of control information pertaining to the selected wireless channel group;

listening for control information on the control channel; and when no control information is received via the control channel, then transmitting new control information via the control channel, the new control information indicating that the control channel is bonded to at least one other wireless communication channel.

17. The method of claim 16, wherein the new control information identifies the at least one other wireless communication channel.

18. The method of claim 17, wherein transmitting new control information via the control channel comprises transmitting a beacon during a beacon period in a superframe of the control channel.

19. The method of claim 16, further comprising, when control information is received via the control channel indicating that the selected wireless communication channel is not bonded with at least one other wireless communication channel, then abstaining from communication on the selected wireless channel group.

20. The method of claim 19, further comprising, when control information is received via the control channel indicating that the control channel is bonded with at least one other wireless communication channel:

determining if sufficient unused data capacity exists in the bonded wireless communication channels for a communication service to be performed by the wireless device;

when it is determined that sufficient unused data capacity exists in the bonded wireless communication channels for the communication service to be performed by the wireless device, then communicating via the bonded wireless communication channels; and when it is determined that sufficient unused data capacity does not exist in the bonded wireless communication channels for the communication service to be performed by the wireless device, then, selecting a second wireless channel group for communication;

identifying a second control channel that has been designated for communication of control information pertaining to the second wireless channel group;

listening for control information on the second control channel; and when no control information is received via the second control channel, then transmitting control information via the second control channel, the control information indicating that the second control channel is bonded to at least one other wireless communication channel.

* * * * *